US009087264B2

(12) United States Patent
Yoshizawa et al.

(10) Patent No.: US 9,087,264 B2
(45) Date of Patent: Jul. 21, 2015

(54) INK JET RECORDING APPARATUS AND NOZZLE RECOVERY METHOD

(71) Applicant: CANON KABUSHIKI KAISHA, Tokyo (JP)

(72) Inventors: Kei Yoshizawa, Yokohama (JP); Hiroshi Tajika, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/689,120

(22) Filed: Nov. 29, 2012

(65) Prior Publication Data

US 2013/0135398 A1 May 30, 2013

(30) Foreign Application Priority Data

Nov. 30, 2011 (JP) ................................ 2011-261947

(51) Int. Cl.
*B41J 2/165* (2006.01)
*G06K 9/46* (2006.01)

(52) U.S. Cl.
CPC ............ *G06K 9/4652* (2013.01); *B41J 2/1652* (2013.01)

(58) Field of Classification Search
CPC ....................................................... B41J 2/165
USPC ...................................................... 347/29–36
See application file for complete search history.

(56) References Cited

U.S. PATENT DOCUMENTS

| | | | | |
|---|---|---|---|---|
| 7,108,348 | B2 * | 9/2006 | Shinkawa et al. | 347/19 |
| 7,673,961 | B2 * | 3/2010 | Shihoh et al. | 347/19 |
| 2003/0132983 | A1 * | 7/2003 | Murakami et al. | 347/30 |
| 2004/0021717 | A1 * | 2/2004 | Nakajima et al. | 347/12 |
| 2004/0041875 | A1 * | 3/2004 | Yazawa et al. | 347/23 |
| 2004/0104974 | A1 | 6/2004 | Edamura | |
| 2005/0122360 | A1 * | 6/2005 | Sakagami et al. | 347/19 |
| 2005/0122373 | A1 * | 6/2005 | Katsu et al. | 347/22 |
| 2007/0052738 | A1 * | 3/2007 | Edamura et al. | 347/5 |
| 2008/0122884 | A1 * | 5/2008 | Ide et al. | 347/9 |
| 2010/0123747 | A1 * | 5/2010 | McReynolds et al. | 347/14 |

FOREIGN PATENT DOCUMENTS

| | | | |
|---|---|---|---|
| CN | 1478653 | A | 3/2004 |
| CN | 1756662 | A | 4/2006 |
| JP | 11-320877 | A | 11/1999 |
| JP | 11-334108 | A | 12/1999 |
| JP | 2003-291374 | A | 10/2003 |

* cited by examiner

*Primary Examiner* — Matthew Luu
*Assistant Examiner* — Lily Kemathe
(74) *Attorney, Agent, or Firm* — Canon USA, Inc. I.P. Division

(57) ABSTRACT

An ink jet recording apparatus includes a recording head having a common liquid chamber and a plurality of nozzles configured to discharge ink supplied from the common liquid chamber using generation of bubbles, and a recovery unit configured to perform recovery processing on the plurality of nozzles, wherein the recovery unit performs the recovery processing while the recovery unit changes a distribution of flow velocity of the ink flowing from the common liquid chamber to the plurality of nozzles by generating bubbles within apart of the nozzles among the plurality of nozzles.

9 Claims, 13 Drawing Sheets

FIG. 9B

| | | DIVIDED NOZZLE ARRAY REGION | | |
|---|---|---|---|---|
| | | (I) | (II) | (III) |
| PRINTING | | ○ | ○ | ○ |
| PRELIMINARY DISCHARGE | | ○ | ○ | ○ |
| SUCTION RECOVERY | S2 | × | × | × |
| | S3 | × | ○ | × |

○ : BUBBLING
× : NON-BUBBLING

FIG. 12

| | PRINTING | SUCTIONING |
|---|---|---|
| DRIVING FREQUENCY f(kHz) | 21 | 84 |
| DRIVING CYCLE Tc (μsec) | 47.6 | 11.9 |
| BLOCK CYCLE Tb (μsec) | 2.68 | 0.67 |
| HENB PULSE WIDTH Pw (μsec) | 0.80 | 0.52 |
| HENB PULSE VOLTAGE (V) | 20 | 25 |
| DEBUBBLING TIME tb (μsec) | 6.2 | 5.6 |
| tb/Tc (%) | 13 | 47 |

INK JET RECORDING APPARATUS AND NOZZLE RECOVERY METHOD

BACKGROUND OF THE INVENTION

1. Field of the Invention

The present invention relates to an ink jet recording apparatus, particularly to a nozzle recovery method for the ink jet recording apparatus.

2. Description of the Related Art

Suction recovery processing is performed on an ink jet recording apparatus when clogging of ink occurs on discharge nozzles of a recording head, or when there is a risk of defective printing caused by bubbles entering an ink flow path. Performing the suction recovery processing enables discharge-interrupting objects such as foreign objects, thickened ink, and bubbles to be discharged to the exterior through the nozzles. However, when ink is suctioned by the conventional suction recovery processing, flow velocity of the ink is lower in an end portion than in a central portion of a common liquid chamber, which communicates with the nozzles. Therefore, it is problematic in that the bubbles accumulated in the end portion of the common liquid chamber cannot be discharged easily.

Japanese Patent Application Laid-Open No. 2003-291374 discusses a technique in which a structure that reduces a flow path sectional area is provided within a cap, and flow velocity in specific nozzles is selectively increased by moving the structure along a nozzle row. Japanese Patent Application Laid-Open No. 11-320877 discusses a technique in which flow velocity in the end portion of the common liquid chamber is increased by making flow path resistance of the central portion of the common liquid chamber be greater than that of the end portion thereof. Japanese Patent Application Laid-Open No. 11-334108 discusses a technique in which flow velocity in the end portion of the common liquid chamber is increased by suctioning the ink while the nozzles at the central portion of the nozzle row are blocked by the structure of the cap.

However, in any of the above-described conventional techniques, the structure may be newly added to the recording head or the cap, or the structure of the recording head or the cap may be changed. Therefore, there is a problem in that the structure thereof becomes complicated. This may result in increase in cost, increase in frequency of failure to occur, and increase in size of the apparatus. Further, in the configuration according to Japanese Patent Application Laid-Open No. 11-320877, changing the shape of the common liquid chamber may have a negative effect on the original ink discharging performance. In the configuration according to Japanese Patent Application Laid-Open No. 11-334108 where the cap contacts the discharge ports, foreign objects may easily enter the nozzles, and thus, there is a risk of increasing the frequency of ink discharge failure.

SUMMARY OF THE INVENTION

The present invention is directed to an ink jet recording apparatus capable of reliably executing recovery processing with respect to nozzles whose flow velocity of ink flowing from a common liquid chamber is relatively low.

According to an aspect of the present invention, an ink jet recording apparatus includes a recording head having a common liquid chamber and a plurality of nozzles configured to discharge ink supplied from the common liquid chamber using generation of bubbles, and a recovery unit configured to perform recovery processing on the plurality of nozzles, wherein the recovery unit performs the recovery processing while the recovery unit changes a distribution of flow velocity of the ink flowing from the common liquid chamber to the plurality of nozzles by generating bubbles within apart of the nozzles among the plurality of nozzles.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 9A and 9B are diagrams illustrating a nozzle control method for the suction recovery processing. FIG. 9A is a diagram illustrating a method of dividing a nozzle row. FIG. 9B is a table illustrating the nozzles used during a printing period, a preliminary discharging period, and a suction recovery period.

FIG. 12 is a table illustrating an example of respective parameters for driving the heater during the printing period and the suction recovery period.

DESCRIPTION OF THE EMBODIMENTS

Various exemplary embodiments, features, and aspects of the invention will be described in detail below with reference to the drawings.

Figure 1:
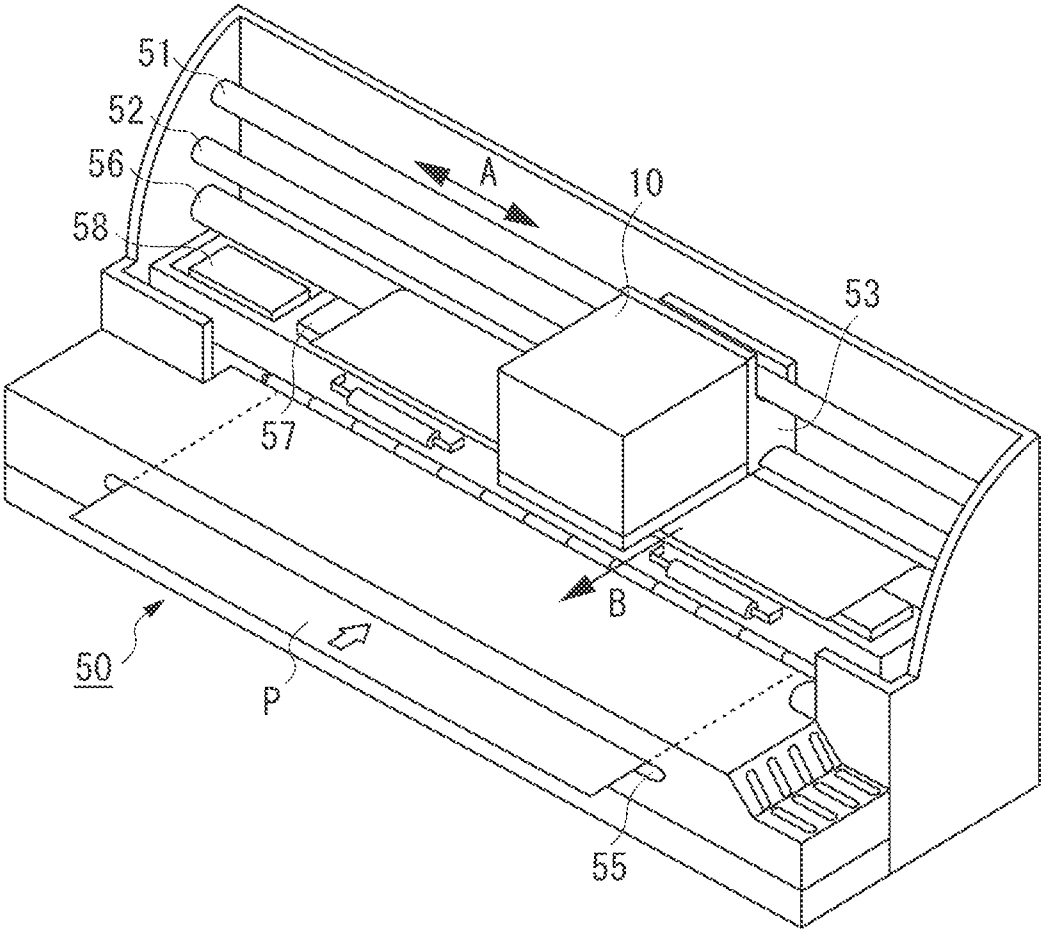
FIG. 1 is a perspective view illustrating an example of an ink jet recording apparatus according to an exemplary embodiment of the present invention.

Hereinafter, a first exemplary embodiment of the present invention will be described. FIG. 1 is a perspective view illustrating an example of the ink jet recording apparatus according to the present exemplary embodiment.

An ink jet recording apparatus 50 according to the present exemplary embodiment is a serial-scan type recording apparatus. In the ink jet recording apparatus 50, a carriage 53 is guided by guide shafts 51 and 52 to be movable in a main scanning direction indicated by an arrow A, as illustrated in FIG. 1. The carriage 53 is moved back-and-forth in the main scanning direction by a carriage motor and a driving force transmission mechanism such as a belt which transmits a driving force of the carriage motor. A recording head 10 and an ink tank (not illustrated) that supplies ink to the recording head 10 are mounted on the carriage 53. The recording head 10 and the ink tank may be formed as an integral structure to configure an ink jet cartridge. A paper sheet P which serves as a recording material is inserted into an insertion opening 55 provided on a front surface of the ink jet recording apparatus 50. Thereafter, a feed roller 56 inverts a conveyance direction of the paper sheet P, and conveys the paper sheet P in a sub-scanning direction indicated by an arrow B in FIG. 1. The recording head 10 moves in the main scanning direction, and repeats a recording operation and a conveyance operation to record an image on the paper sheet P in a sequential manner. The recording head 10 discharges ink onto a print region of the paper sheet P placed on a platen 57 during the recording operation, whereas the recording head 10 conveys the paper sheet P by a distance corresponding to the recording width in the sub-scanning direction during the conveyance operation.

A recovery unit 58 is disposed on a left end portion in a moving region of the carriage 53 in FIG. 1. The recovery unit 58 serves as a recovery system which faces a discharge port forming a surface of the recording head 10, which is mounted on the carriage 53. The recovery unit 58 includes a cap 15 which caps the discharge port of the recording head 10, and a suction pump (not illustrated) which introduces negative pressure to an interior portion of the cap 15. In order to maintain the ink discharge condition of the recording head 10 in a favorable state, the recovery unit 58 performs recovery processing (also referred to as "suction recovery processing") of the nozzles. In the suction recovery processing, the recovery unit 58 introduces negative pressure into the cap 15 that covers the discharge port, suctions and discharges the ink from the discharge port. The recovery unit 58 can perform recovery processing (also referred to as "discharge recovery processing") of the nozzles. In the discharge recovery processing, ink which does not contribute to image formation is discharged from the discharge port to the interior portion of the cap 15.

Figure 2:
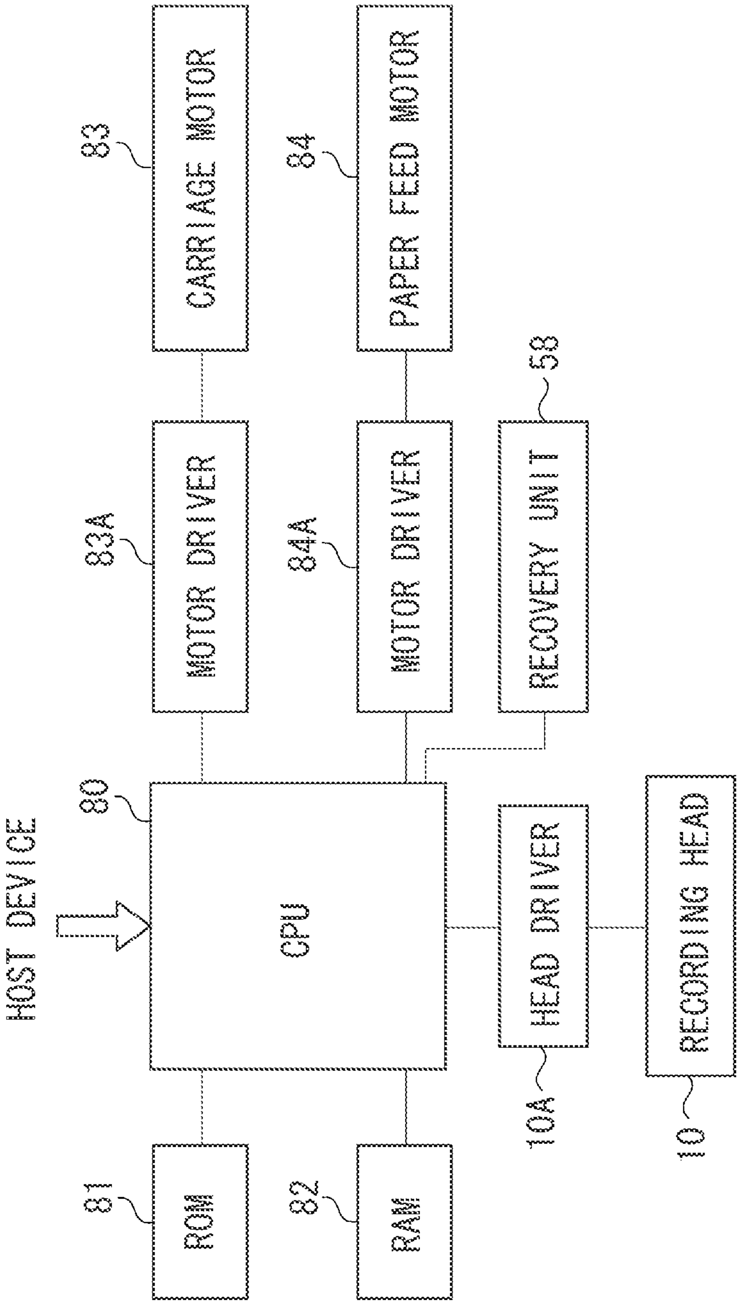
FIG. 2 is a block diagram illustrating a general configuration of a control system.

FIG. 2 is a block diagram illustrating a general configuration of a control system of the ink jet recording apparatus 50.

In FIG. 2, a central processing unit (CPU) 80 executes operational control processing and data processing of the ink jet recording apparatus 50. The CPU 80 also controls operations of the recovery unit 58. Therefore, the CPU 80 configures a part of the recovery system according to the exemplary embodiment of the present invention. A program for the above-described processing is stored in a read only memory (ROM) 81. A random access memory (RAM) 82 serves as a work area for executing the processing.

The CPU 80 supplies driving data (image data) and a driving control signal (a heat pulse signal) of a heater 21 to a head driver 10A, and causes the recording head 10 to discharge ink. The head driver 10A can be configured and disposed on a substrate of the recording head 10. The CPU 80 controls a carriage motor 83 via a motor driver 83A. The carriage motor 83 drives the carriage 53 in the main scanning direction. The CPU 80 controls a paper feed motor 84 via a motor driver 84A. The paper feed motor 84 supplies a driving force for conveying the paper sheet P in the sub-scanning direction. Further, the CPU 80 controls the recovery unit 58, and executes the suction recovery processing or the discharge recovery processing.

Figure 3:
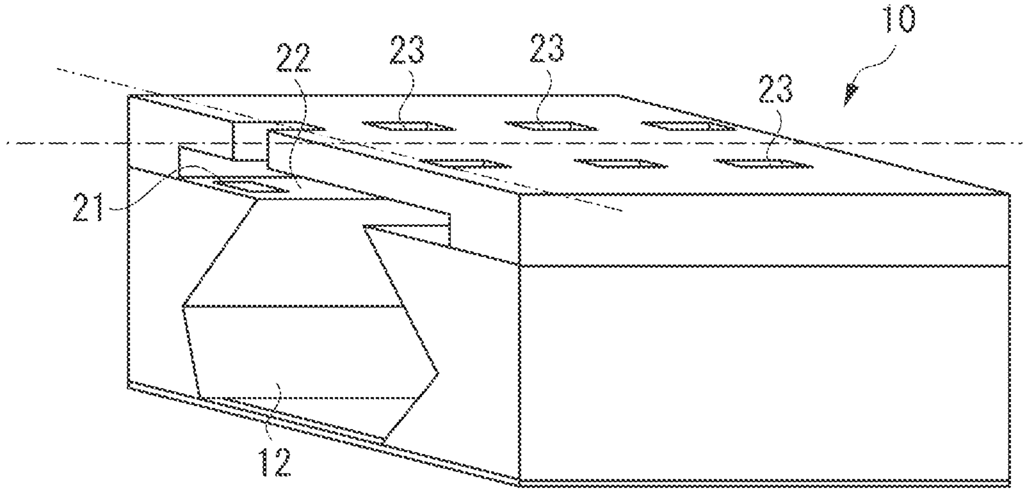
FIG. 3 is a perspective view illustrating a specific structure of a recording head.

FIG. 3 is a perspective view illustrating a specific structure of the recording head 10.

As illustrated in FIG. 3, the recording head 10 includes a plurality of discharge ports 23 arranged in a row, a plurality of nozzles 22 respectively communicating with the plurality of discharge ports 23, and a common liquid chamber 12 mutually communicating with each of the nozzles 22. Ink for recording an image is supplied to the common liquid chamber 12 from an ink supply unit (not illustrated) via a supply tube 11. The ink within the common liquid chamber 12 is supplied to each of the nozzles 22 due to a capillary phenomenon. Then, the ink is held within each nozzle 22 in a stable manner by forming a meniscus on the discharge port 23 located on a tip of the nozzle 22. A heater 21 which serves as an electro-thermal conversion device is provided within each nozzle 22. When the power is supplied to each of the heaters 21 through wirings (not illustrated), the heater 21 generates thermal energy and heats the ink within the nozzle 22. With this, bubbles are generated by film boiling, and ink droplets are discharged from the discharge port 23 due to blowing energy of the bubbles. The multi-nozzle ink jet recording head 10 is configured by arranging the discharge ports 23 in high density such as 1200 dpi.

Figure 4:
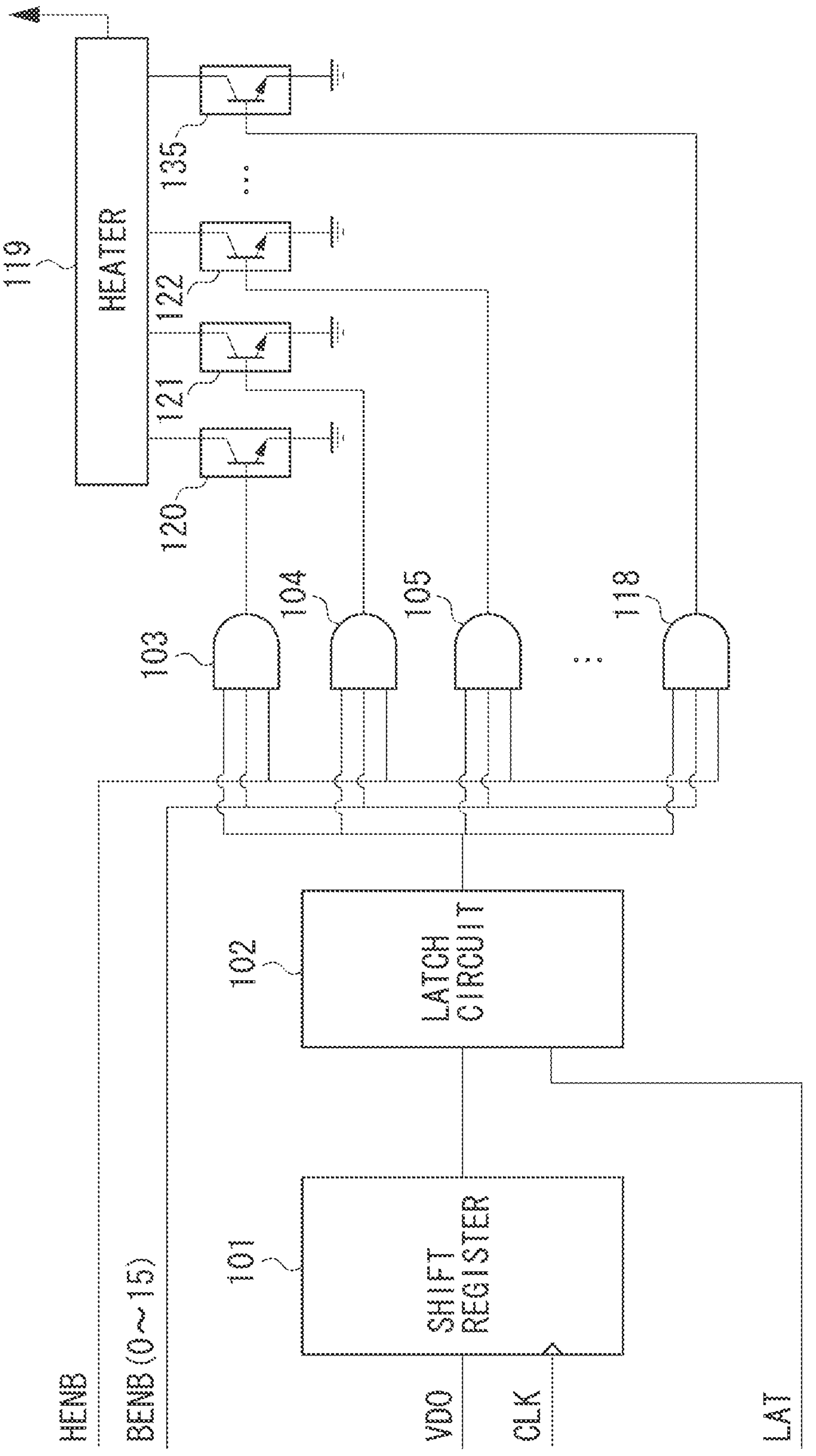
FIG. 4 is a block diagram illustrating a configuration of a control circuit which drives the recording head having 768 recording elements.
Figure 5:
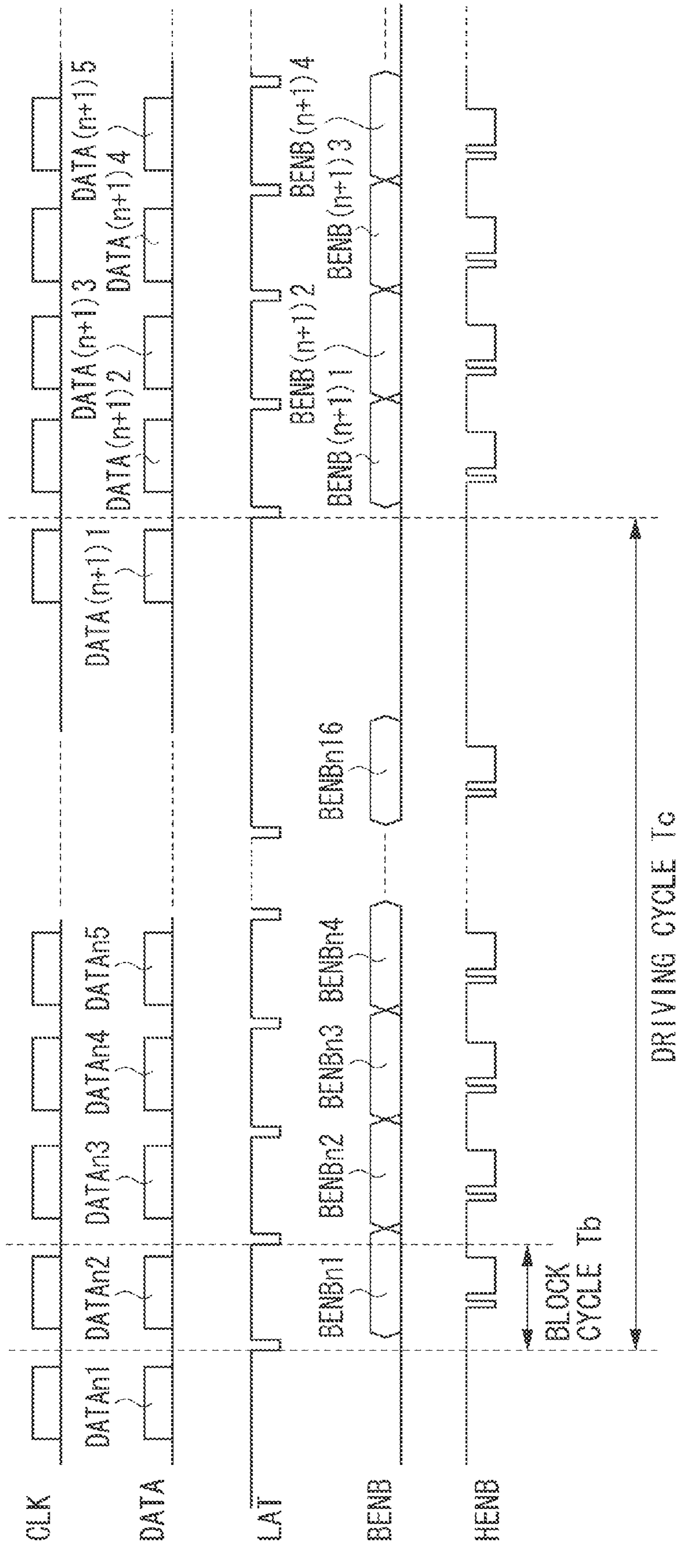
FIG. 5 is a timing chart of driving signals for operating the recording head.

FIG. 4 is a block diagram illustrating a configuration of a control circuit for driving the recording head 10 which includes 768 recording elements. FIG. 5 is a timing chart of driving signals for operating the recording head 10.

As illustrated in FIG. 4, the recording head 10 according to the present exemplary embodiment includes a shift register 101, a latch circuit 102, sixteen AND circuits 103 through 118, sixteen transistors 120 through 135, and a heater 119.

In the recording head 10 configured as the above, when binary image data (DATA) is serially transferred from the exterior in synchronization with a transfer clock (CLK), the shift register 101 performs serial-to-parallel conversion of the image data sequentially. Since the recording head 10 includes 768 recording elements, when 768 bits of image data (DATA) is transferred, the transferred image data is latched in the latch circuit 102 by a latch signal (LAT). In the present exemplary embodiment, the CPU 80 divides 768 recording elements into sixteen blocks. Then, the CPU 80 provides a pulse of enable signal (BENB0 through BENB15) and a pulse of heater driving signal (HENB) to each block. Every time the ink is discharged from the nozzles 22, the CPU 80 selects a pulse width Pw (also referred to as a "heat pulse width" hereinafter) and pulse rise timing of the heater driving signal (HENB) from a pulse table that is set prior to the shipment of the recording apparatus, based on variations in discharge amount and a head temperature of the recording head 10 and number of nozzles 22, which discharge ink simultaneously. Through this, only a transistor corresponding to the recording element to which the image data (DATA) in a bit-ON state is supplied is set to be ON by the enable signal. As a result, the heater 119 is heated, and ink is discharged through the nozzles 22. Then, the CPU 80 performs the same control processing on each of the blocks in a sequential manner, and completes a cycle (hereinafter, referred to as a "driving cycle Tc") of recording processing. The CPU 80 causes the carriage 53 on which the recording head 10 is mounted to move in the main scanning direction, and performs the above-described recording control. Through this, the CPU 80 executes recording by causing the ink to be consecutively discharged onto the entire scanning region.

In order to perform the suction recovery processing of the nozzles 22 of the recording head 10 configured as the above, the CPU 80 seals a row of the nozzles 22 with the cap 15, and introduces negative pressure into the interior portion of the cap 15 by the suction pump. Through this, a flow of ink is generated in the ink flow path within the recording head 10 due to differences in pressure between the interior portion of the cap 15 and the interior portion of the recording head 10. Then, bubbles which are accumulated in the supply tube 11 and the common liquid chamber 12 are discharged from the discharge ports 23 with the ink.

In the present exemplary embodiment, a nozzle flow path resistance R of the nozzles 22 is increased to discharge bubbles that cannot be discharged by the conventional suction recovery processing. Specifically, the CPU 80 drives a part of the heaters 21 of the nozzles 22 during the suction operation, and performs the suction recovery processing which includes control processing for increasing the flow velocity in the end portion of the common liquid chamber 12.

Figure 6:
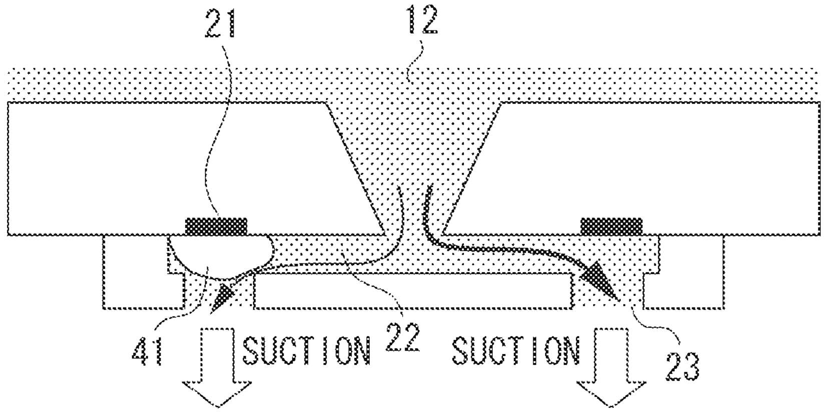
FIG. 6 is a schematic diagram illustrating an increased effect of flow path resistance of nozzles due to bubbles generated therein.

FIG. 6 is a schematic diagram illustrating an increased effect of the nozzle flow path resistance R due to bubbles generated within the nozzles 22. The thickness of each arrow in FIG. 6 indicates the magnitude of the flow velocity.

As illustrated in FIG. 6, when the ink is heated by the heater 21, a bubble 41 is generated within the nozzle 22. The bubble 41 interrupts a flow of ink within the nozzle 22, so that a flow path sectional area of the ink is reduced. As a result, the nozzle flow path resistance R of the nozzle 22 is temporarily increased until the bubble 41 is vanished.

In the ink jet recording head 10, the CPU 80 selectively generates bubbles within the nozzles 22 in an optional manner by the above-described head control circuit. Accordingly, the CPU 80 can temporarily increase the nozzle flow path resistance R of the optional nozzles 22 at optional timing.

In a case where the CPU 80 generates bubbles within the part of the nozzles 22 while the suction unit such as a suction pump applies negative pressure on the row of nozzles 22, the nozzle flow path resistance R of the nozzles 22 where the bubbles are generated is increased simultaneously. On the other hand, the nozzle flow path resistance R of the nozzles 22 where the bubbles are not generated is relatively small, and thus, the flow velocity of the ink within these nozzles 22 becomes higher. Through this, the CPU 80 controls a distribution of the flow velocity of the ink from the common liquid chamber 12, which communicates with the nozzles 22, to the plurality of nozzles 22, and enhances the discharge performance of residual bubbles within the common liquid chamber 12. Accordingly, the CPU 80 controls the distribution of the flow velocity of the ink from the common liquid chamber 12 to the plurality of nozzles 22, selects the nozzles 22 to generate bubbles therein, and selects values of the heater driving pulse frequency f and the heat pulse width Pw. Through this, the CPU 80 can optionally control recovery processing of the nozzles 22 within a certain range.

Hereinafter, the recovery processing of the nozzles 22 performed on the above-described ink jet recording apparatus 50 will be described in detail.

Figure 7:
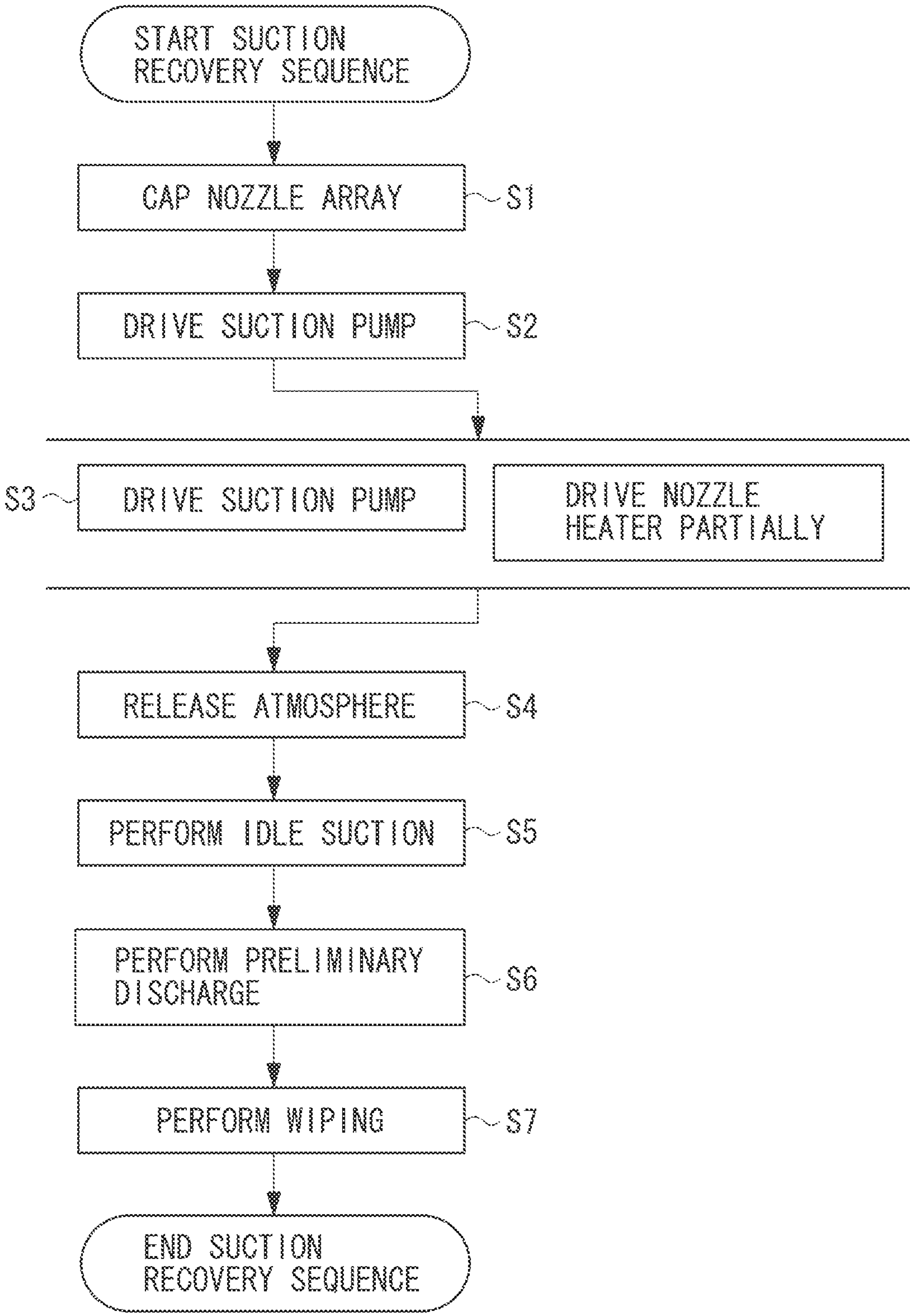
FIG. 7 is a flowchart illustrating suction recovery processing of nozzles performed on the ink jet recording apparatus.
Figure 8:
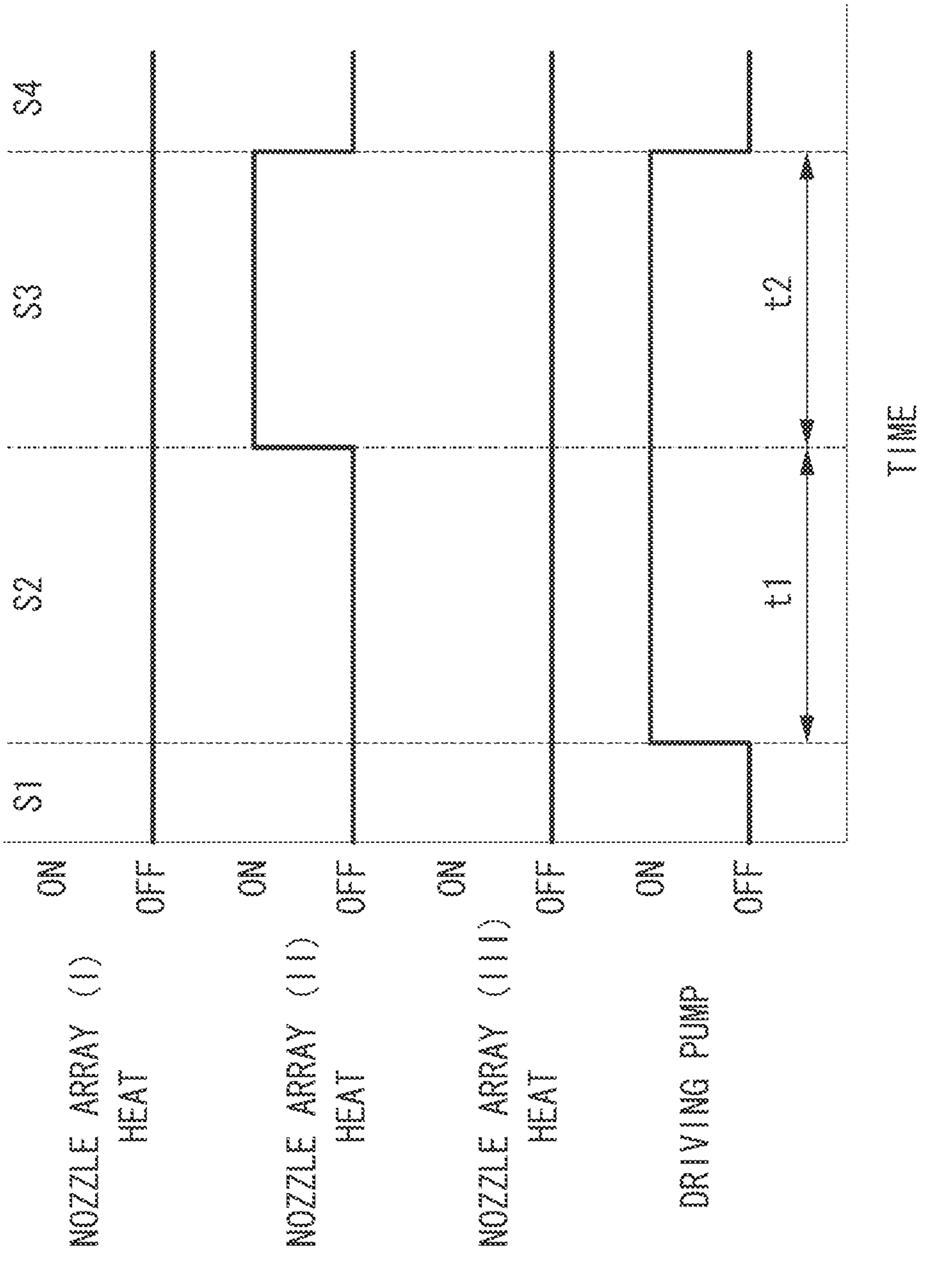
FIG. 8 is a timing chart of driving pulses of a pump and heaters in the suction recovery processing.
Figure 9A:
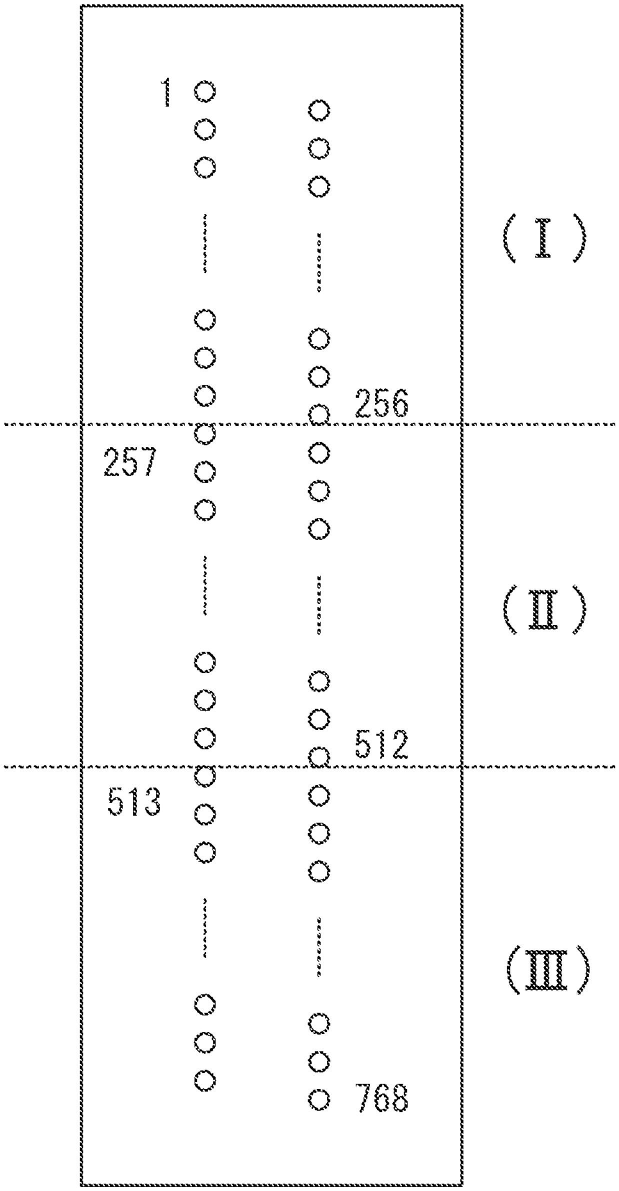
Figure 10A:
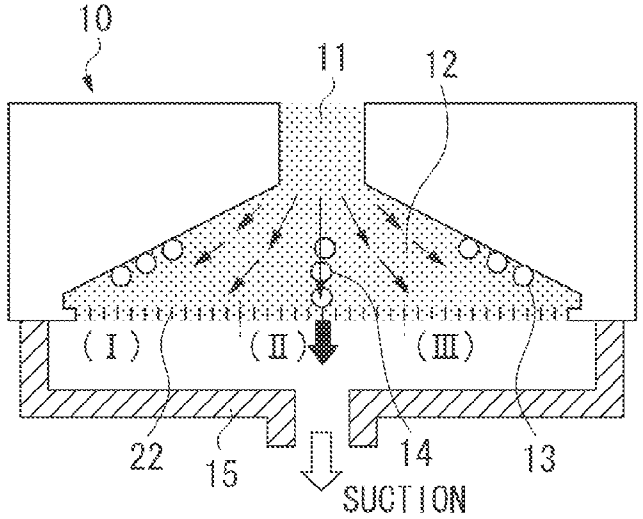
FIGS. 10A through 10C are schematic diagrams illustrating control processing of flow velocity within a common liquid chamber.
Figure 10B:
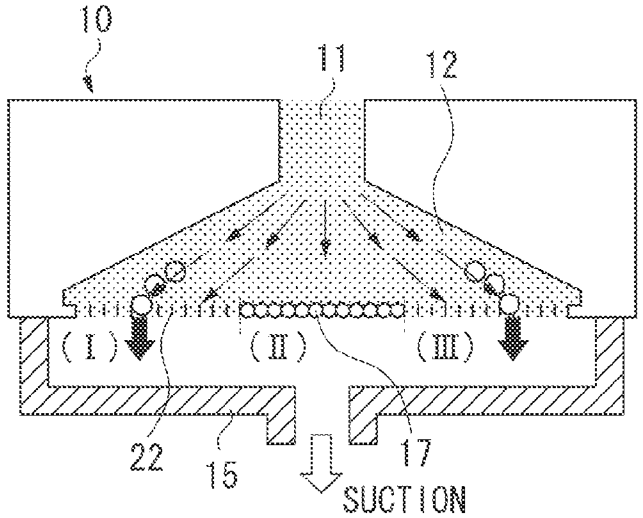
Figure 10C:
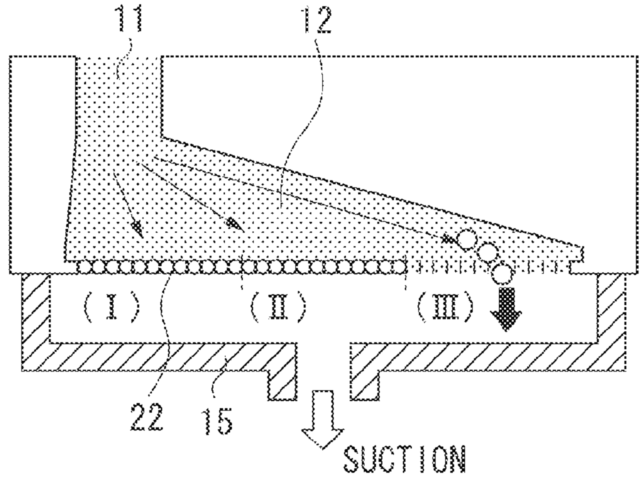

FIG. 7 is a flowchart illustrating the suction recovery processing of the nozzles 22 performed on the ink jet recording apparatus 50. FIG. 8 is a timing chart of driving pulses of a pump and heaters in the suction recovery processing. FIGS. 9A and 9B are diagrams illustrating a nozzle control method for the suction recovery processing. FIG. 9A is a diagram illustrating the method for dividing the nozzle row. FIG. 9B is a table illustrating the nozzles 22 used in the printing period, the preliminary discharging period, and the suction recovery period. FIGS. 10A through 10C are schematic diagrams illustrating the control processing of the flow velocity within the common liquid chamber 12.

In the present exemplary embodiment, the CPU 80 performs the suction recovery processing by dividing the row of nozzles 22 into three regions (I), (II), and (III) as illustrated in FIG. 9A.

As illustrated in FIG. 9B, during the normal printing, the CPU 80 performs printing by generating bubbles within the nozzles 22 of the entire row in the three regions (I) through (III). Further, in the preliminary discharging period, the CPU 80 causes the ink to be discharged from the discharge ports 23 by generating bubbles within the nozzles 22 of the entire row in the three regions (I) through (III).

In step S1, as illustrated in FIG. 10A, the CPU 80 causes the cap 15 to cap the row of nozzles 22, and starts the suction recovery processing.

In step S2, the CPU 80 does not apply a heater driving signal to any of the nozzles 22, and drives the suction pump to introduce negative pressure to the interior portion of the cap 15. Then, the CPU 80 causes the suction pump to suction the interior portion of the cap 15 for a certain period of time (t1). Through this, the bubbles accumulated within the supply tube 11 and the common liquid chamber 12 can be discharged. This processing is performed in a similar manner as the conventional suction recovery processing. Therefore, the CPU 80 performs the suction operation without changing the distribution of the flow velocity of the ink from the common liquid chamber 12 to the nozzles 22. With this, most of the bubbles 14 accumulated in the central portion of the common liquid chamber 12 where the flow velocity of ink is relatively high can be discharged to the exterior of the nozzles 22. However, there may be a case in which the bubbles 13 accumulated in the end portion of the common liquid chamber 12 where the flow velocity of ink is relatively low are not discharged sufficiently.

Therefore, in step S3, while the suction pump applies the negative pressure to the internal portion of the cap 15, the CPU 80 consecutively transmits, to the row of nozzles 22 in the region (II) where the flow velocity of the ink is relatively high, a driving signal for driving the heaters 21 for a certain period of time (t2). With this, as illustrated in FIG. 10B, bubbles 17 are generated within the nozzles 22 in the region (II). Then, the flow velocity within the nozzles 22 in the regions (I) and (III) where the bubbles are not generated, and the flow velocity in the right and left end portions of the common liquid chamber 12 which communicate with the nozzles 22 in the regions (I) and (III) become higher in comparison to the case in step S2. As a result, the bubbles 13 kept within the right and left portions of the common liquid chamber 12 without being discharged by the processing in step S2 can be discharged.

Thereafter, in step S4, the CPU 80 stops the suction pump, and opens an atmosphere releasing valve (not illustrated) to release the negative pressure. Then, in step S5, the CPU 80 performs idle suction processing of the cap 15. In step S6, the CPU 80 performs preliminary discharge processing. In step S7, the CPU 80 performs wiping processing. After performing the above-described processing in a sequential manner, the CPU 80 ends the suction recovery processing.

Incidentally, conditions such as the number of steps, processing order, processing time period, and selection of the nozzles 22 in which the bubbles are generated in the suction period, which are employed in the above described suction recovery processing are not limited to those described in the present exemplary embodiment. These conditions can be selected and set in a suitable manner based on a configuration of the entire apparatus, a configuration of the recording head, and a design concept thereof. Through this, the suction recovery processing can be performed in such a manner that more bubbles can be discharged with less amount of suctioned ink and a shorter suction period.

Further, in the above-described exemplary embodiment, processing of forming the bubbles in the suction period, which is an aspect of the exemplary embodiment of the present invention, is only performed in step S3. However, this processing may be performed on a plurality of steps, and the nozzles 22 in which the bubbles are generated may be changed in each step. For example, the CPU 80 generates bubbles within the nozzles 22 of the regions (II) and (III) to discharge bubbles from the left end portion of the common liquid chamber 12 intensively. Then, the CPU 80 generates bubbles within the nozzles 22 in the regions (I) and (II) to discharge bubbles from the right end portion of the common liquid chamber 12 intensively. In this manner, the CPU 80 may discharge bubbles from the right and left end portions of the common liquid chamber 12 sequentially instead of discharging the bubbles therefrom simultaneously.

In addition, the region with slow flow velocity and the region where the bubbles cannot be discharged easily may vary depending on the shape of the common liquid chamber 12. Therefore, according to the shape of the common liquid chamber 12, the CPU 80 properly selects the nozzles 22 and generates bubbles. With this, a distribution of flow velocity with higher discharge performance of bubbles can be realized. For example, in a case where the common liquid chamber 12 is formed into a shape as illustrated in FIG. 10C, the flow velocity is low in a leading tip region of the common liquid chamber 12 on the right, and thus, the bubbles accumulated in this region may not be discharged easily. Therefore, it is desirable for the CPU 80 to selectively increase the flow velocity of the right side portion of the common liquid chamber 12 by generating bubbles within the nozzles 22 in the regions (I) and (II).

Generally, the CPU 80 employs a plurality of types (modes) of suction recovery processing. Therefore, it is effective for the CPU 80 to select whether to employ the above-described bubble generation processing in each type (mode) of the suction recovery processing. The processing described in the present exemplary embodiment may be performed only in a certain situation (such as when the apparatus 50 is just arrived, when the recording head 10 is replaced, or when a choke suction operation is just performed), where particularly a large amount of residual bubbles are kept within the common liquid chamber 12. Through this, an amount of waste ink can be further reduced.

Further, the present exemplary embodiment is applicable to any type of the recovery processing which discharges bubbles to the outside of the recording head via the nozzles by using an ink flow. In other words, the present exemplary embodiment is applicable not only to the recovery processing embodied in the exemplary embodiment which employs suctioning (depressurization), but also to the recovery processing which employs pressurization.

Figure 11:
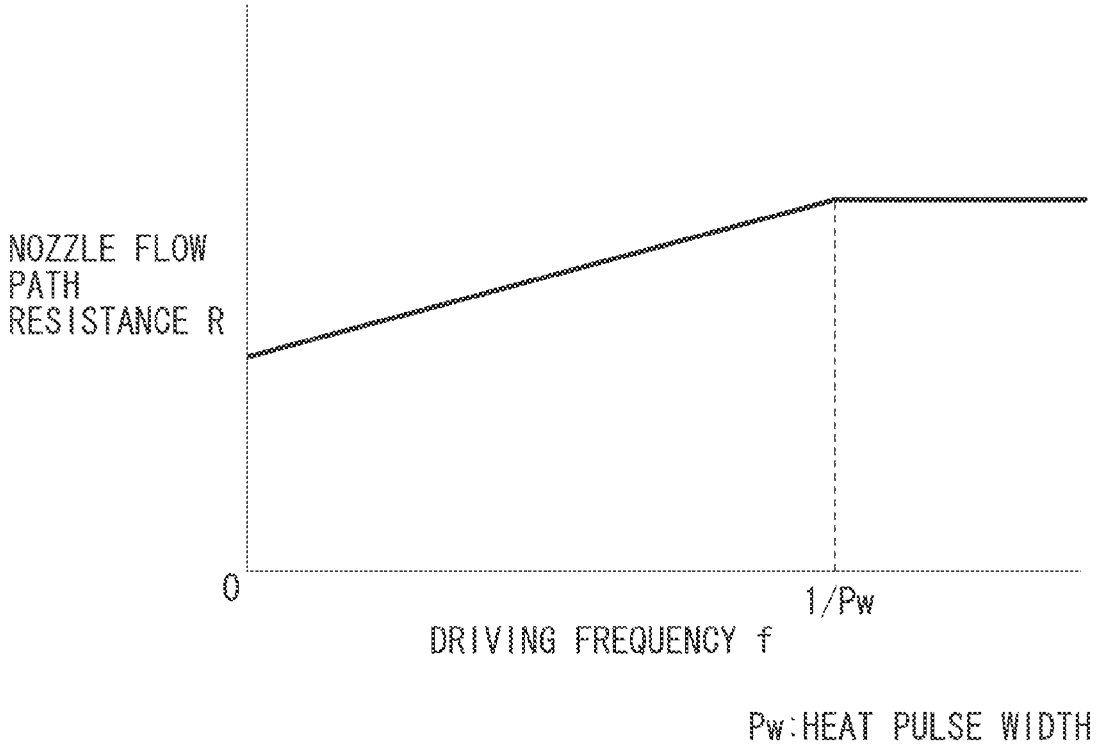
FIG. 11 is a graph illustrating a relationship between a heater driving pulse frequency f and a nozzle flow path resistance R.

Hereinafter, a second exemplary embodiment according to the present invention will be described. FIG. 11 is a graph illustrating a relationship between a heater driving pulse frequency f and a nozzle flow path resistance R.

As illustrated in FIG. 11, the nozzle flow path resistance R depends on the heater driving pulse frequency f. Therefore, in the recovery processing according to the first exemplary embodiment, an increased amount AR of the nozzle flow path resistance R caused by generation of the bubbles can be optionally controlled within a certain range by changing the values of the heater driving pulse frequency f and the heat pulse width Pw.

Therefore, in the present exemplary embodiment, when the CPU 80 generates bubbles in the nozzle recovery processing, the CPU 80 performs the control processing described in the first exemplary embodiment. In addition to the above, the CPU 80 drives the heater based on the driving signal according to a pulse table separately provided for the nozzle recovery processing instead of the driving signal according to a pulse table provided for the printing period. A pulse for the printing period is designed by placing emphasis on discharge stability. However, because the ink is not necessarily discharged from the discharge ports in the nozzle recovery processing, a pulse for the nozzle recovery processing is designed in such a manner that the increased amount AR of the nozzle flow path resistance R caused by generation of bubbles becomes as great as possible. Specifically, when the pulse for the nozzle recovery processing is designed, the heater driving pulse frequency f is set to be greater than that of the printing period. In other words, the driving cycle Tc thereof is set to be shorter than that of the printing period. Further, pulse timing, a pulse width, a pulse voltage of the heater driving signal (HENB) are set in such a manner that a duration time tb (referred to as a “debubbling time tb”) of generating bubbles by a pulse becomes smaller than that of the printing period. Through this, a percentage of time tb/Tc in which the generated bubbles interrupts the ink flow by a driving cycle is greater than that of the printing period.

FIG. 12 is a table illustrating an example of parameters for driving the heater in the printing period and the suction recovery period.

As illustrated in FIG. 12, in the suction recovery period, the pulse width of the heater driving signal (HENB) is set to be shorter, so that the value of the heater driving pulse frequency f becomes four times as great as that in the printing period. At the same time, a pulse voltage (V) is set to be greater than that of the printing period, so that a magnitude of the blowing energy equals to that of the printing period. Accordingly, the percentage of time tb/Tc in the suction recovery period can be increased to 47% whereas the percentage of time tb/Tc in the printing period is 13%. This enables the increased amount AR of the nozzle flow path resistance R to be greater in the nozzles 22 where the bubbles are generated. As a result, a control effect of the flow velocity within the common liquid chamber 12 according to the present exemplary embodiment can be further increased.

In the present exemplary embodiment, in order to generate bubbles in a greater magnitude and longer bubbling duration by a shorter pulse, a complicated configuration such as double pulse may be employed as the heater driving signal (HENB).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-261947 filed Nov. 30, 2011, which is hereby incorporated by reference herein in its entirety.

What is claimed is:

1. An ink jet recording apparatus comprising:

a recording head including a common liquid chamber, a plurality of nozzles configured to discharge ink supplied from the common liquid chamber and a plurality of heaters disposed on each of the nozzles and configured to generate bubbles within each of the nozzle;

a cap configured to cap the plurality of nozzles;

a suction pump configured to introduce negative pressure to an interior portion of the cap; and a control unit configured to drive heaters corresponding to some of the plurality of nozzles when driving the suction pump.

2. The ink jet recording apparatus according to claim 1, wherein the some of the plurality of nozzles are nozzles whose flow velocity of the ink flowing from the common liquid chamber to the nozzle is relatively high.

3. The ink jet recording apparatus according to claim 1, wherein the control unit is configured to drive the heaters when driving the suction pump according to a driving signal different from a driving signal for a printing period.

4. A nozzle recovery method for an ink jet recording apparatus configured of a recording head including a common liquid chamber a plurality of nozzles configured to discharge ink supplied from the common liquid chamber, a plurality of heaters disposed on each of the nozzles and configured to generate bubbles within each of the nozzles, a cap configured to cap the plurality of nozzles, and a suction pump configured to introduce negative pressure to an interior portion of the cap, the nozzle recovery method comprising:

driving heaters corresponding to some of the plurality of nozzle when driving the suction pump.

5. The nozzle recovery method according to claim 4, comprising the some of the plurality of nozzles whose flow velocity of the ink flowing from the common liquid chamber to the nozzles is relatively high.

6. The nozzle recovery method according to claim 4, comprising driving the heaters when driving the suction pump according to a driving signal that is different from a driving signal for a printing period.

7. The ink jet recording apparatus according to claim 1, wherein the some of the plurality of nozzles are nozzles at a center of the plurality of nozzles.

8. The ink jet recording apparatus according to claim 1, wherein, the control unit is configured to drive the suction pump while driving the heaters corresponding to the some of the plurality of nozzles after driving the suction pump without driving the plurality of heaters.

9. The nozzle recovery method according to claim 4, comprising driving the suction pump while driving the heaters corresponding to the some of the plurality of nozzles after driving the suction pump without driving the plurality of heaters.

* * * * *